United States Patent [19]
Chen et al.

[11] Patent Number: 6,135,154
[45] Date of Patent: Oct. 24, 2000

[54] WATER FAUCET

[76] Inventors: Wei Fu Chen, No. 16, Lane 533, Dajyh Rd., Dali City, Taichung County; Huei Yuh Liou, No. 11, gaann-tour Lane, Nan-gaang tsuen, gwo-shing shiang, nan-tour county, both of Taiwan

[21] Appl. No.: 08/748,168

[22] Filed: Nov. 12, 1996

[51] Int. Cl.$^7$ .................................................. F16K 51/00
[52] U.S. Cl. ...................................... 137/625.79; 210/424
[58] Field of Search .............................. 137/625.29, 801; 210/418, 420, 424, 460, 434

[56] References Cited

U.S. PATENT DOCUMENTS

| | | | |
|---|---|---|---|
| 3,249,122 | 5/1966 | Fleckenstein et al. | 137/625.29 |
| 3,741,394 | 6/1973 | Defenbaugh | 210/424 X |
| 5,164,082 | 11/1992 | Lin | 210/460 X |

*Primary Examiner*—John Fox
*Attorney, Agent, or Firm*—Pro-Techtor International Services

[57] ABSTRACT

A faucet comprises a main body, a control valve column, and a filter mounted on the main body. The main body is provided with an axial hole in which the control valve column is movably received. The control valve column is provided at one end thereof with a handle fastened therewith such that the control valve column can be caused by the handle to displace in the axial hole so as to let the liquid out directly from an outlet of the main body or to let the liquid out of the outlet of the main body via the filter.

1 Claim, 5 Drawing Sheets

WATER FAUCET

FIELD OF THE INVENTION

The present invention relates generally to a water faucet, and more particularly to a water faucet having a filtration means.

BACKGROUND OF THE INVENTION

As illustrated in FIG. 1, a prior art water faucet 10 has a spout 11, which is provided with a joint 12 fastened therewith for connecting the spout 11 with a water filter 15 via a connection pipe 14. The joint 12 is provided with a connection switch 13 for regulating the flow of water from the spout 11 or into the connection pipe 14. The water filter 15 has an outlet 16 from which the filtered water is let out over a sink 17. Such a prior art water faucet as described above is defective in design in that it is rather complicated in construction, and that it can not be used handily in conjunction with a water filter.

SUMMARY OF THE INVENTION

The primary objective of the present invention is to provide a water faucet having a filtration effect.

The water faucet of the present invention comprises a main body, a control valve column, and a water filter. The water filter is fastened with the main body of the water faucet. The main body of the water faucet is provided therein with the control valve column capable of axial movement to regulate the flow of water in such a manner that water is filtered before it is let out, or that water is let out directly from the spout without being filtered.

DETAILED DESCRIPTION OF THE EMBODIMENT

Figure 1:
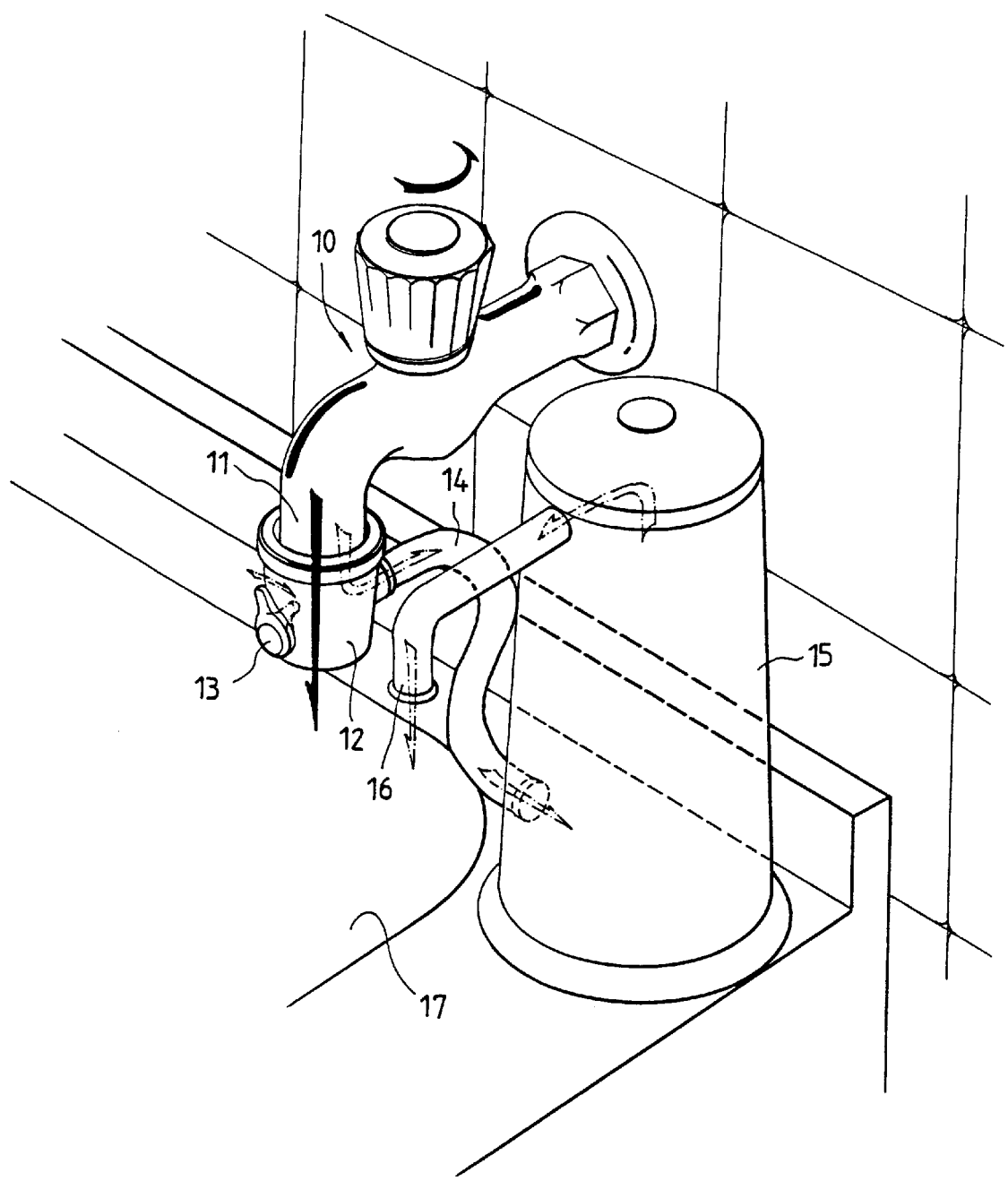
FIG. 1 shows a schematic view of a prior art water faucet at work in conjunction with a water filter.
Figure 2:
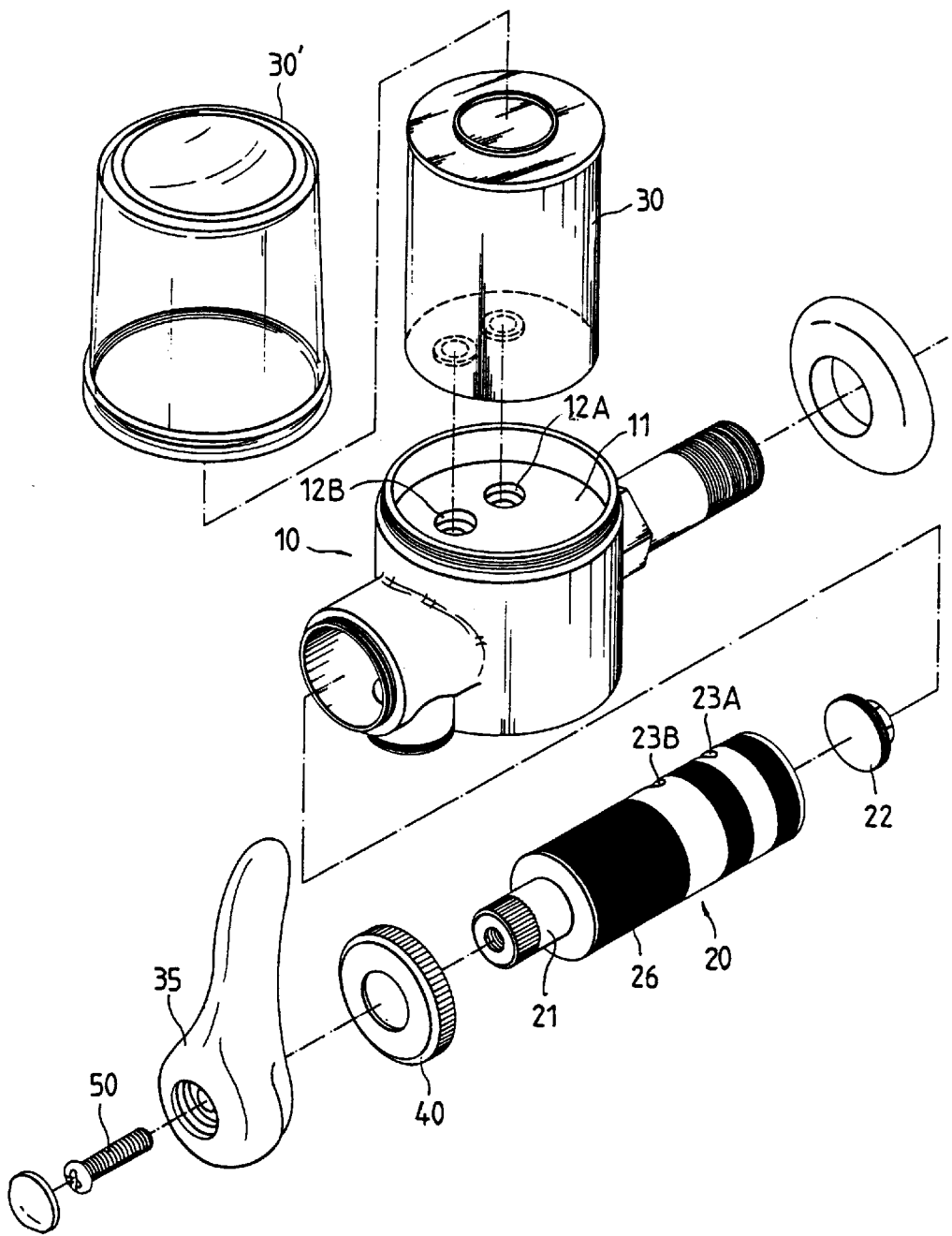
FIG. 2 shows an exploded view of a water faucet of the preferred embodiment of the present invention.
Figure 3:
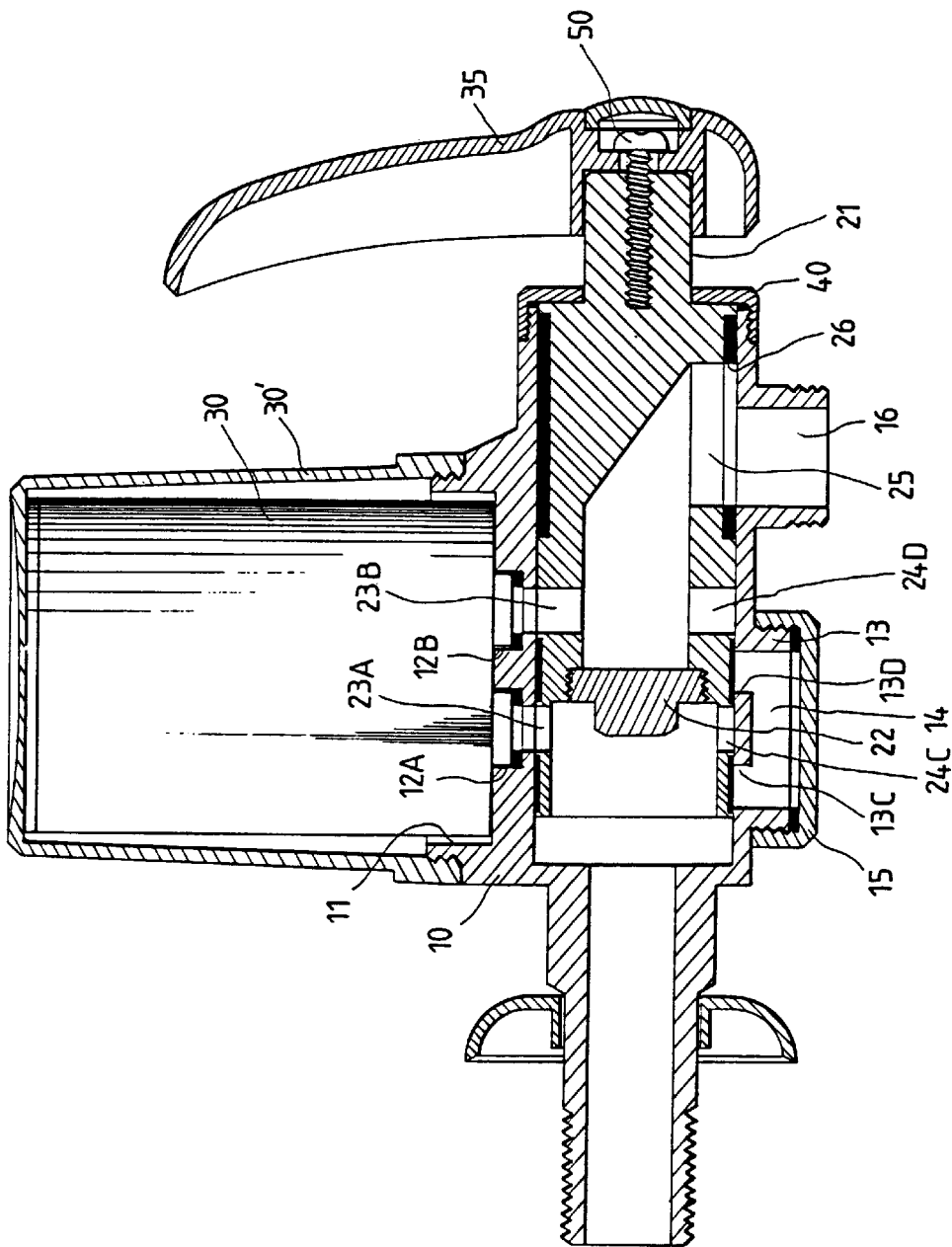
FIG. 3 shows a sectional schematic view of the water faucet in combination according to the embodiment of the present invention.
Figure 4:
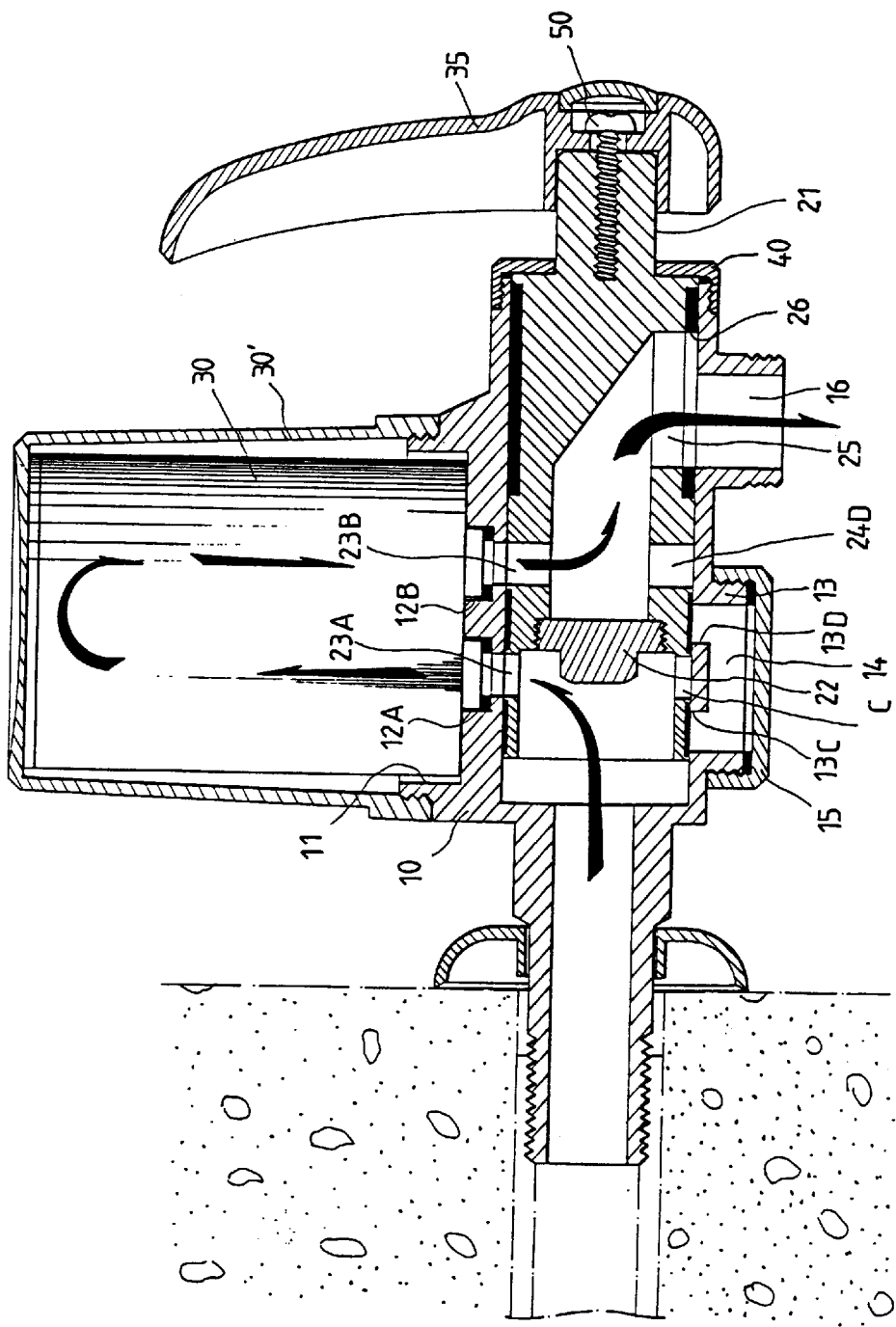
FIG. 4 shows a schematic view of the present invention at work.
Figure 5:
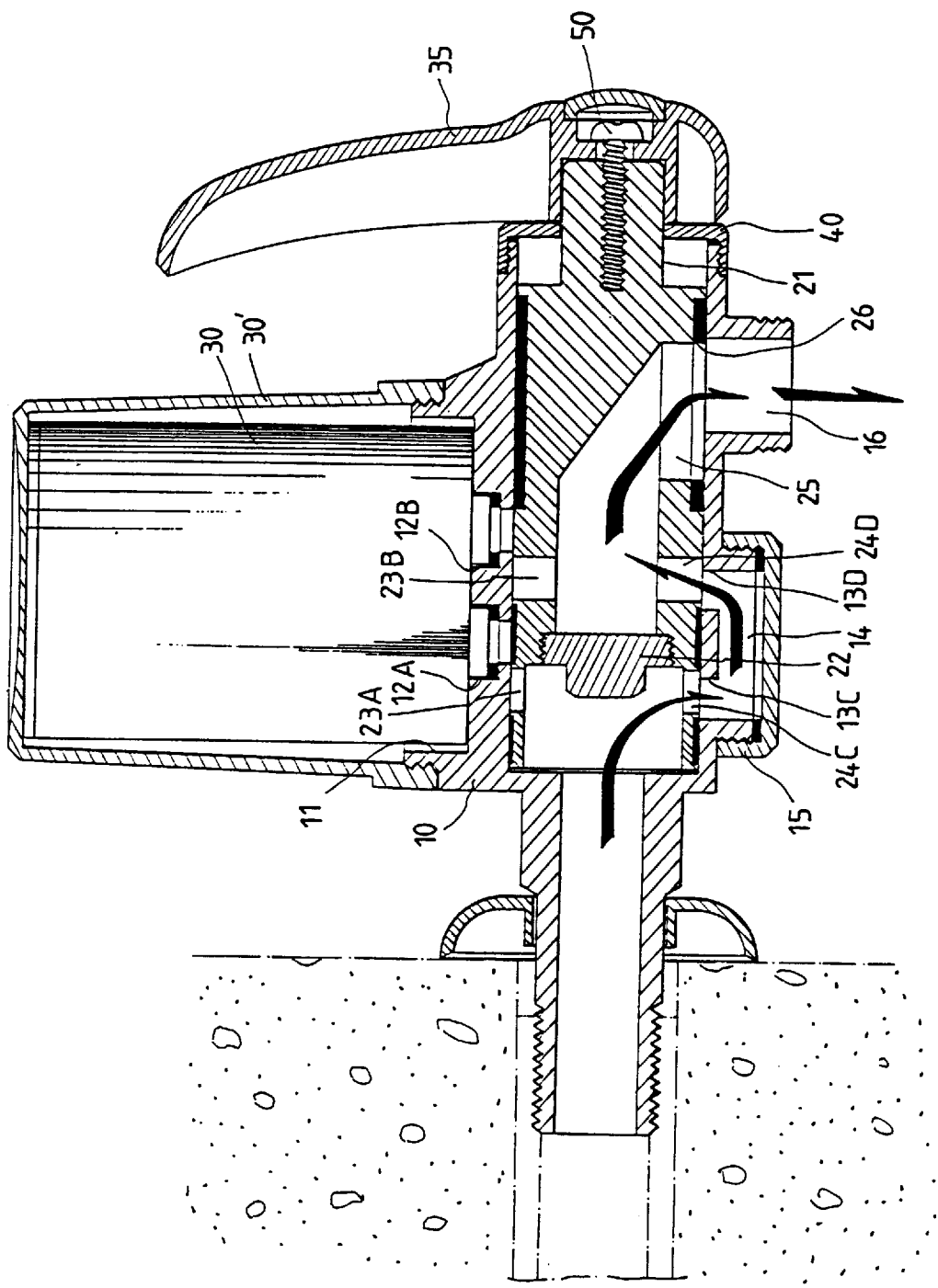
FIG. 5 shows another schematic view of the present invention at work.

As shown in FIGS. 2–5, an improved water faucet embodied in the present invention is composed of a main body 10, a control valve column 20, and a water filter 30.

The main body 10 is hollow and tubular in construction and is provided with a receiving seat 11 having in the bottom wall thereof two stepped holes 12A and 12B. The main body 10 is further provided with a flange 13 which is in turn provided with two through holes 13C and 13D. The flange 13 is engaged securely with a nut 15 such that the through holes 13C, 13D, and a trough 14 form a channel. The main body 10 is still further provided with an outlet 16 adjacent to the flange 13. The water is let out via the outlet 16.

The control valve column 20 is provided at one end thereof with a stem 21, which is engaged with a handle 35. The control valve column 20 has another end which is hollow and is provided with a plug 22 inserted thereinto. The control valve column 20 is further provided in the wall thereof with two through holes 23A and 23B, and two flow holes 24C and 24D. Located by the flow hole 24D is a valve opening 25 into which a plastic sleeve 26 is fitted.

The water filter 30 is mounted on the receiving seat 11 of the main body 10 such that the water filter 30 is secured to the main body 10 by a fastening cylinder 30'.

In combination, the handle 35 is fastened with the stem 21 of the control valve column 20 by a fastening bolt 50. The open end of the control valve column 20 is engaged with the main body 10 by a stopping cap 40 such that the control valve column 20 is capable of axial movement in the main body 10, and that the control valve column 20 is actuated by the handle 35. As the control valve column 20 is pushed forward by the handle 35, the flow holes 24C and 24D are aligned with the through holes 13C and 13D. In the meantime, the through holes 23A, 23B and the stepped holes 12A, 12B are staggered, whereas water is let out from the outlet 16 via the flow hole 24C, the through hole 13C, the trough 14, the through hole 13D, and the flow hole 24D. The water so let out from the outlet 16 is not filtered. However, if the control valve column 20 is pulled by the handle 35 such that the control valve column 20 is displaced to arrive at the top point of the stopping cap 40, and that the through holes 23A and 23B of the control valve column 20 are aligned respectively with the stepped holes 12A and 12B, and further that the flow holes 24C, 24D and the through holes 13C, 13D are staggered, thereby resulting in the entry of water into the water filter 30 via the through hole 23A and the stepped hole 12A. The filtered water is then let out from the water outlet 16 via the stepped hole 12B, the through hole 23B and the valve opening 25.

The amount of water that is let out from the water outlet 16 can be regulated by the radical rotation of the control valve column 20, which is actuated by the motion of pushing or pulling the handle 35. The radical rotation of the control valve column 20 brings about the staggering displacement of the valve opening 25 and the water outlet 16. As the staggering displacement becomes greater, the amount of the water that is let out of the water outlet 16 becomes smaller. No water is let out of the water outlet 16 when the valve opening 25 and the water outlet 16 are completely staggered.

The embodiment of the present invention described above is to be regarded in all respects as being merely illustrative and not restrictive. Accordingly, the present invention may be embodied in other specific forms without deviating from the spirit thereof. The present invention is therefore to be limited only the scopes of the following appended claims.

What is claimed is:

1. A faucet comprising:
   a main body comprising a liquid outlet and a receiving seat with a plurality of stepped holes,
   a flange with a plurality of through holes,
   a control valve column, and
   a liquid filter; wherein
   said flange is affixed to said main body so as to form a trough, said trough and said through holes form a channel in communication with said liquid outlet, and said liquid filter is mounted on said main body,
   said main body includes an axial hole to house said control valve column such that said control valve column is displaced in said axial hole so as to allow liquid to flow from said liquid outlet via said liquid filter in a first position, and to allow liquid to flow from said liquid outlet without passing through said filter when said control valve column is in a second position.

* * * * *